(12) United States Patent
Reverchon

(10) Patent No.: US 8,505,204 B2
(45) Date of Patent: Aug. 13, 2013

(54) METHOD OF MANUFACTURING A BALL JOINT ASSEMBLY

(75) Inventor: Patrick Jean-Marie Firmin Reverchon, Crancot (FR)

(73) Assignee: SKF Aerospace France, Saint-Vallier-sur-Rhone (FR)

(*) Notice: Subject to any disclaimer, the term of this patent is extended or adjusted under 35 U.S.C. 154(b) by 0 days.

(21) Appl. No.: 13/560,795

(22) Filed: Jul. 27, 2012

(65) Prior Publication Data
US 2012/0291287 A1  Nov. 22, 2012

Related U.S. Application Data

(62) Division of application No. 12/216,324, filed on Jul. 2, 2008, now abandoned.

(30) Foreign Application Priority Data

Jul. 5, 2007  (FR) .................................... 07 04861

(51) Int. Cl.
*B21D 53/10* (2006.01)

(52) U.S. Cl.
USPC .............. 29/898.044; 29/898.04; 29/898.042; 29/898.043; 29/898.046; 384/206; 384/210; 403/119; 403/122; 403/133

(58) Field of Classification Search
USPC ................ 29/898, 898.04, 898.042, 898.043, 29/898.044, 898.046, 898.047; 384/206, 384/210; 403/119, 122, 133
See application file for complete search history.

(56) References Cited

U.S. PATENT DOCUMENTS

| 892,105 | A | | 6/1908 | White |
|---|---|---|---|---|
| 2,047,885 | A | * | 7/1936 | Riebe ............................ 384/210 |
| 4,509,870 | A | | 4/1985 | Taki |
| 4,846,590 | A | | 7/1989 | Teramachi |
| 5,073,038 | A | | 12/1991 | O'Connell |
| 5,265,965 | A | | 11/1993 | Harris et al. |
| 5,641,235 | A | * | 6/1997 | Maughan et al. ............. 403/133 |
| 6,190,080 | B1 | | 2/2001 | Lee |
| 2008/0138150 | A1 | | 6/2008 | Budde et al. |
| 2009/0003927 | A1 | | 1/2009 | Howes et al. |

FOREIGN PATENT DOCUMENTS

| DE | 10236829 | 2/2004 |
|---|---|---|
| DE | 102004041084 | 3/2006 |
| FR | 1547030 | 11/1968 |
| FR | 2617923 | 1/1989 |
| WO | 2007009423 | 1/2007 |

* cited by examiner

*Primary Examiner* — Richard Chang
(74) *Attorney, Agent, or Firm* — Dowell & Dowell, P.C.

(57) ABSTRACT

A method of manufacturing a ball joint assembly including providing an internal centerpiece substantially in the shape of a hollow truncated sphere, placing the centerpiece within a metal hollow sleeve and deforming the sleeve by forcing the sleeve against an outer surface of the centerpiece to shape the sleeve to complement the outer surface of the centerpiece, forming at least one groove in an exterior surface of the sleeve and there after molding a plastic matrix composite material over the exterior surface of the sleeve to form an external body over the sleeve.

11 Claims, 3 Drawing Sheets

METHOD OF MANUFACTURING A BALL JOINT ASSEMBLY

CROSS REFERENCE TO RELATED APPLICATIONS

This application is a Divisional Application of U.S. application Ser. No. 12/216,324, filed Jul. 2, 2008, the contents of which are incorporated in their entirety herein by reference. The parent application also claimed priority from French Application 07 04861, filed Jul. 5, 2007.

BACKGROUND OF THE INVENTION

1. Field of the Invention

The present invention relates to a mechanical joint assembly. It also relates to a method of manufacturing a ball joint assembly.

2. Brief Description of the Related Art

The invention is more particularly concerned with ball joint assemblies which comprise, by way of external component, a body made of a plastic matrix composite material and, by way of an internal component, a joint component such as a ball joint centerpiece, with the interposition of a metal rigid insert between this external body and this internal component. Stated differently, this kind of ball joint assembly typically corresponds to a ball joint or to a rolling bearing of which the ring known as the "outer ring" is externally covered with a composite material so that this "outer" ring ultimately corresponds to the metal insert mentioned hereinabove and is fixedly attached to the composite material, the latter forming the abovementioned external body. In practice, this external body made of composite material is shaped into highly varying structures, such as a collar, a flange analogous to a fitting or a link rod tube end or the like.

The invention thus preferably, although not exclusively, relates to the field of aeronautics in which the use of composite materials is encouraged because of their lightness of weight.

This type of ball joint assembly should not be confused with the assemblies proposed in U.S. Pat. No. 6,139,788 and the improvement WO-A-2007/009423 thereto, in which assemblies an internal ball is mounted in the manner of a ball joint inside a shell made of composite material, attached by push-fitting around the ball and is then covered with a cast metal or injection-moulded plastic external body. This structure with a composite intermediate shell makes it possible to achieve a remarkable degree of sliding between the ball and the shell, but is able to withstand only very limited mechanical stress levels otherwise there is the risk that the ball will become "dislocated" from its shell.

Likewise, the type of ball joint assembly with which the invention is concerned does not correspond to the joint structures that incorporate a synthetic packing ring covering an antifriction insert. An example of that kind of synthetic ring is given in FR-A-1 547 030. Indeed in service, these structures do not transmit any load to this synthetic ring, which in any case is designed to be soft and elastic, particularly for reasons of fit.

As far as the type of ball joint assembly to which the invention relates is concerned, an important technical restriction as far as the interface between the insert and the composite body is concerned must, however, be noted. Specifically, it is commonplace for the insert to have an exterior geometry such as that of a cylinder on a circular base, centred on the axis of symmetry of revolution of its interior surface, which in the case of a ball joint is typically spherical. That is associated with the fact that this insert, as explained hereinabove, corresponds to the "outer" ring of a ball joint or rolling bearing, the manufacture of which systematically includes a machining operation in order to bring the exterior surface of this ring to its definitive cylinder dimensions as explained in FR-A-2 796 110. That being the case, when the ball joint assembly is highly stressed, the fixed connection between the external body and the insert has a tendency to yield, through the shearing of the plastic, the demise of the body/insert interface being brought about all the more readily as a result of the cylindrical exterior geometry of the insert, particularly when the joint is loaded along the central axis of this cylindrical geometry.

SUMMARY OF THE INVENTION

It is an object of the present invention to propose a joint assembly of the kind defined hereinabove, which offers good mechanical integrity in that its body/insert interface is able, without yielding, to withstand intense mechanical operating stresses.

To this end, the subject of the invention is a mechanical joint assembly, particularly a ball joint assembly, comprising an external body made of a plastic matrix composite material, in which there is housed a joint internal component such as a ball joint centrepiece, with the interposition of a metal rigid hollow insert which, on the one hand, delimits an interior surface collaborating in articulated contact with the internal component and, on the other hand, delimits an exterior surface both substantially in the shape of a truncated sphere and fixedly connected to the external body being covered by this body in order to form an interface via which stresses can be transmitted between this insert and this external body.

The idea underlying the invention is that of "replacing" the cylindrical geometry of the exterior surface of the insert with a spherical geometry. This measure brings numerous technical advantages. Hence, for a given width of insert, the area of contact between the insert and the external body is larger, reducing the mechanical stress concentrations of the body/insert interface. In other words, for the same rupture strength and by comparison with a joint assembly of the prior art, the thickness of the insert and/or that of the external body, each according to the invention, can then be reduced.

According to one specific embodiment, the spherical exterior surface of the insert defines an axis of symmetry of revolution which passes through its centre, this spherical exterior surface being covered by the external body on each side of its centre along this axis of symmetry of revolution. In particular, the spherical exterior surface of the insert is advantageously truncated by two imaginary planes perpendicular to its axis of symmetry of revolution and situated one on each side of its centre. Thus, by virtue of its geometric design, the truncated spherical shape of the exterior surface of the insert enhances the retention of the insert in directions transverse to the plane(s) of truncation of this spherical shape, particularly in the direction of the axis of symmetry of revolution of its exterior surface.

In practice, the joint assembly according to the invention advantageously constitutes a ball joint assembly or a rolling assembly, the joint internal component then being either a ball joint centrepiece or a plurality of rolling elements such as balls, rollers and needles, with or without cage, respectively.

In the case of a ball joint assembly, another advantage of the invention is that, should the ball joint centrepiece become seized in the insert, the latter acts like a fuse in so far as, once the connection between the exterior surface of the insert and the external body has yielded through the shearing of the plastic of this body, the insert and the centrepiece seized inside this insert constitute a one-piece subassembly capable of turning in the manner of a pseudo-ball joint in a hollow housing delimited by the broken interface between the insert and the external body. Thus, the ball joint assembly according to the invention can then operate in a degraded mode, providing an articulated connection, the kinematic characteristics of which will stem from the collaboration between the spherical exterior surface of the insert and the pseudo-spherical interior wall of the aforementioned housing, these kinematic characteristics being similar to those initially stemming from the collaboration between the spherical exterior surface of the centrepiece and the complementary interior surface of the insert.

According to one particularly advantageous measure according to the invention, the exterior surface of the insert is provided with at least one groove filled by a corresponding part of the external body.

By virtue of this measure, the fixed connection between the insert and the external body is significantly strengthened: the composite material filling this or these grooves creates a region that resists the spread of damage to the body/insert interface when this interface begins to be sheared. Specifically, the presence of this or these grooves means that the profile of this interface, the definition of which is tied to the truncated spherical shape of the exterior surface of the insert, is not strictly circular, but has recesses and lumps thus increasing the area of contact between the insert and the external body.

According to some additional advantageous features of the joint assembly according to the invention, considered in isolation or in any technically feasible combinations thereof:
  the exterior surface of the insert is provided with a number of grooves which intersect with one another;
  the or each groove extends lengthways in a peripheral direction of the exterior surface of the insert;
  the or at least one of the grooves extends lengthwise in a plane substantially perpendicular to an axis of symmetry of revolution defined by the exterior surface of the insert;
  the or at least one of the grooves extends lengthwise in a helical direction centred on an axis of symmetry of revolution defined by the exterior surface of the insert;
  the or at least one of the grooves extends lengthwise in a direction substantially parallel to an axis of symmetry of revolution defined by the exterior surface of the insert.

Another subject of the invention is a method of manufacturing a ball joint assembly, which comprises, in succession:
  a first step in which a ball joint centrepiece which delimits an exterior surface in the form of a truncated sphere is obtained;
  a second step in which a metal tubular sleeve is fitted around the centrepiece;
  a third step in which a pressing or forming force is applied to the exterior surface of the sleeve in order to apply the entire interior surface of the sleeve against the exterior surface of the centrepiece until it is made to complement the exterior surface of the centrepiece, the exterior surface of the sleeve then being substantially in the form of a truncated sphere; and
  a fourth step in which moulding in particular is used to add an external body made of a plastic matrix composite material around the sleeve in such a way that the sleeve constitutes an insert, the exterior surface of which is fixedly attached to the external body, being covered by this body, to form an interface via which stresses can be transmitted between this insert and this external body, wherein, between the end of the third step and the start of the fourth step, the substantially spherical envelope defined by the exterior surface of the sleeve is maintained.

This method makes it possible to manufacture a mechanical joint assembly like the one defined hereinabove where the joined internal component belonging to this assembly is a ball joint centrepiece.

The method according to the invention makes good use of the fact that the objective is to make the exterior surface of the insert spherical. To this end, at the end of the third step, the exterior surface of the sleeve has this spherical geometry, because of how this third step has progressed. As a result, in contrast to the methods of the prior art in which the exterior surface of the sleeve is machined to shape it into a cylinder, as proposed for example in FR-A-2 796 110, the fourth step can be performed directly on completion of the third step, thus reducing both the time and the cost of the method while at the same time ultimately obtaining a ball joint assembly of which the interface between the body and the insert can, in service, and without yielding, withstand significant mechanical stress.

According to one specific embodiment of this method, at the end of the first step, the ball joint centrepiece obtained defines an axis of symmetry of revolution which passes through the centre of the spherical exterior surface thereof and which extends at right angles to two imaginary planes of truncation of this surface, these two planes being situated one on each side of the centre. During the third step, the pressing or forming force is applied to the sleeve on each side of this centre.

According to one particularly advantageous measure of this method, at the end of the third step, at least one groove is created, particularly by machining, in the exterior surface of the sleeve, this or these grooves being filled with the composite material of the external body during the fourth step.

By virtue of this measure there is obtained a ball joint assembly the fixed connection between the insert and external body of which is strengthened, as explained hereinabove. In practice, creating the groove or grooves, particularly by machining, is an operation that is easy to perform in so far as the dimensions of the grooves that have to be obtained can cope with wide tolerances, particularly tolerances that are far wider than can be tolerated by a surface configuration used, for example, to assemble the insert mechanically because, during the fourth step of the method, the moulding of the external body means that the composite material naturally fills this or these grooves.

BRIEF DESCRIPTION OF THE DRAWINGS

The invention will be better understood upon reading the description which will follow, given solely by way of example and with reference to the drawings in which.

DESCRIPTION OF THE PREFERRED EMBODIMENT

Figure 1:
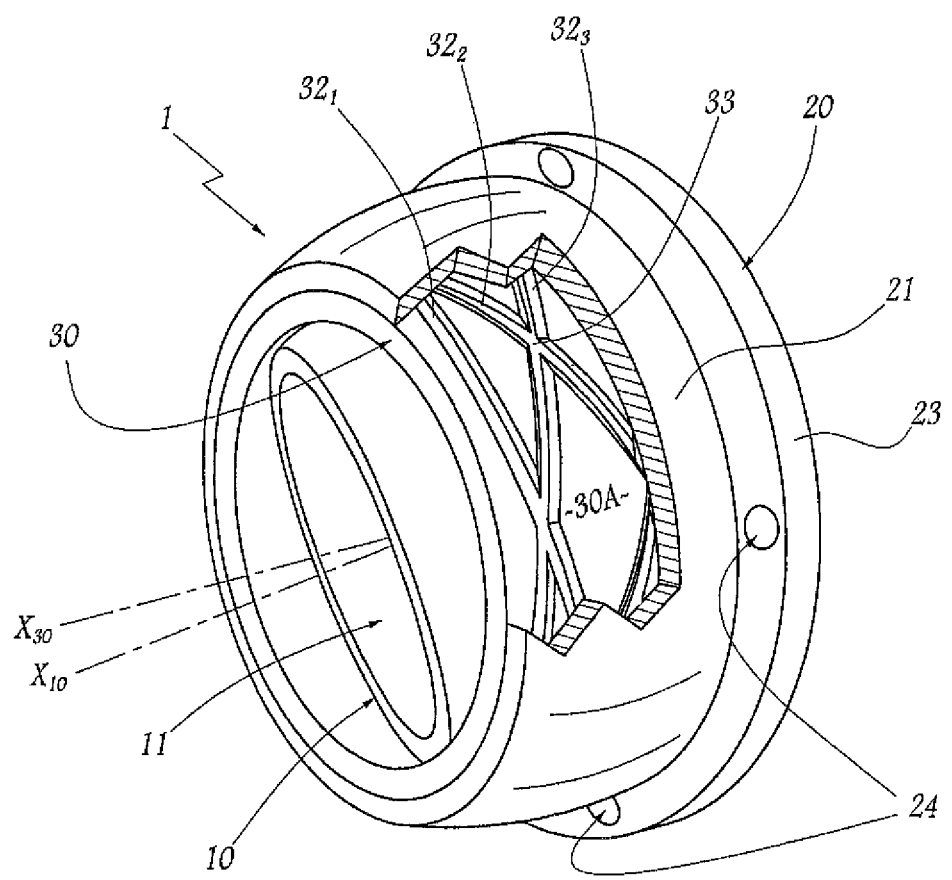
FIG. 1 is a perspective view, with cutaway, of a ball joint assembly according to the invention.
Figure 2:
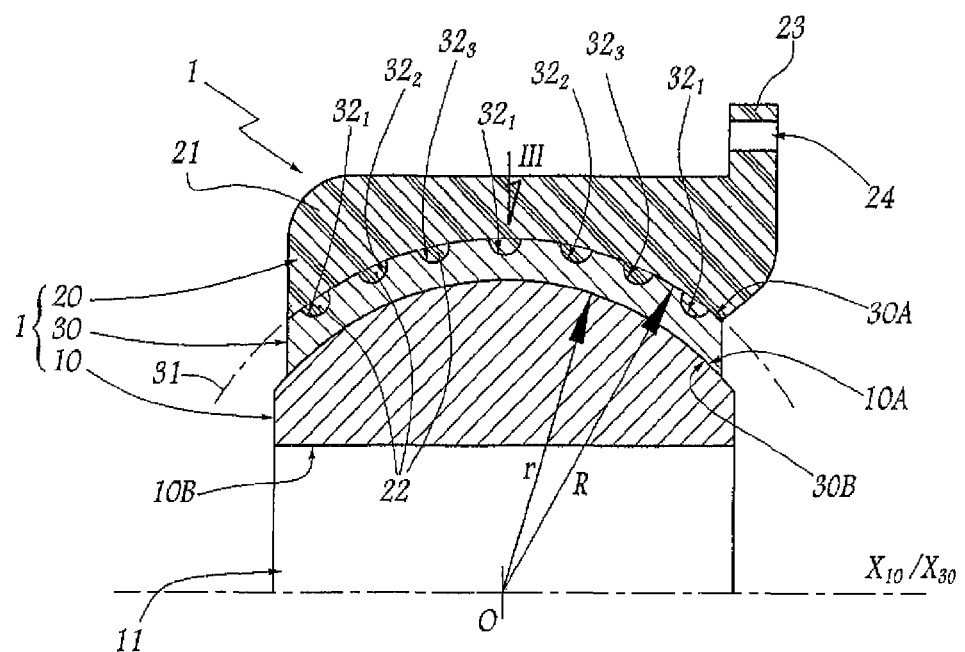
FIG. 2 is half a cross section of the ball joint assembly of FIG. 1.
Figure 3:
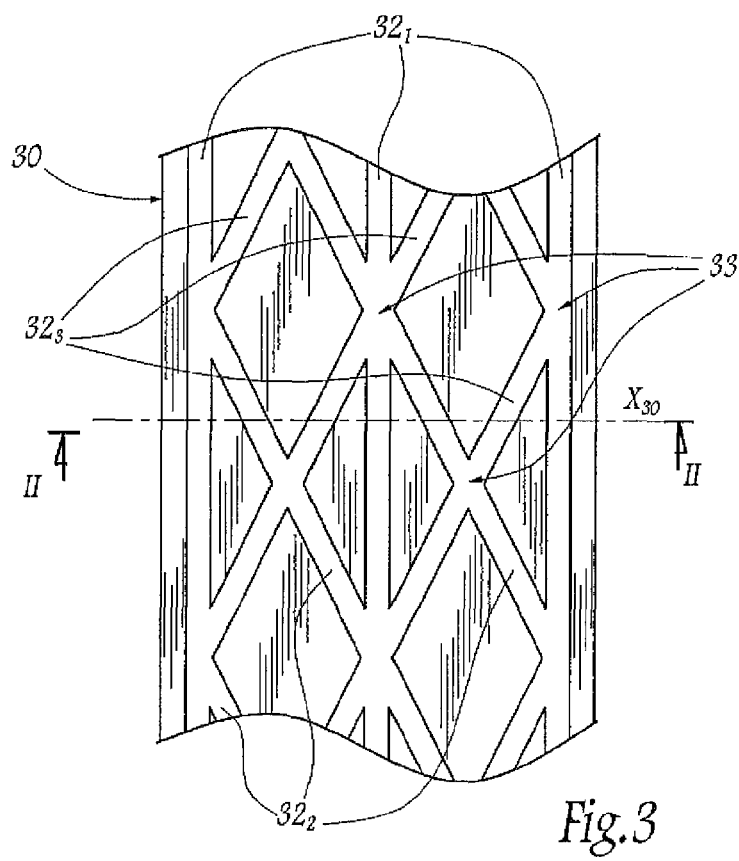
FIG. 3 is a schematic elevation in the direction of arrow III marked in FIG. 2, of one part, considered on its own, of the ball joint assembly of FIG. 1, the planar section of FIG. 2 being indicated by a line II-II in FIG. 3.

FIGS. 1 to 3 depict a ball joint assembly 1 essentially comprising an internal centrepiece 10 and an external body 20, with an insert 30 interposed between them.

The centrepiece 10 is a hollow part defining an axis of symmetry of revolution $X_{10}$. The exterior surface 10A of the centrepiece is spherical, centred on a point O lying on the axis $X_{10}$ and truncated by two imaginary planes perpendicular to this axis, these being situated one on each side of the point O.

The interior surface 10B of the centrepiece 10 is cylindrical of axis $X_{10}$. This surface 10B thus delimits a housing 11 in which a part, not depicted, such as a link rod, that has a cylindrical exterior surface that substantially complements the surface 10B can be housed, and assembled therewith.

The insert 30 is also a hollow part, which defines an axis of symmetry of revolution $X_{30}$. The interior surface 30B of the insert 30 complements the surface 10A, that is to say that this surface 30B is spherical, centred at O and having a radius r substantially equal to that of the surface 10A. The surface 30B is truncated by two imaginary planes perpendicular to the axis $X_{30}$, situated on each side of the point O. Because their shapes complement one another, the surfaces 10A and 30B are in contact with one another in an articulated manner, so that the centrepiece 10 and the insert 30 have, the one relative to the other, three degrees of freedom in rotation about O. In this regard, it may be noted that the centrepiece 10 is depicted in two different articulated positions relative to the insert 30 in FIGS. 1 and 2, the axes $X_{10}$ and $X_{30}$ coinciding in FIG. 2 whereas, in FIG. 1, these axes are inclined relative to one another so that they intersect at O.

In order for the surfaces 10A and 30B to be articulated to one another precisely and durably, the centrepiece 10 and the insert 30 are made of metal.

The exterior surface 30A of the insert 30 is spherical, centred on O and truncated by the two same truncation planes as the surface 30B. The radius of the surface 30A is denoted R, the thickness of the insert corresponding to the difference between the radius R and the radius r.

The surface 30A is provided with peripheral grooves forming recesses in the thickness of the insert from the spherical geometric envelope 31 defined by the surface 30A, as is clearly visible in FIG. 2 in which the extensions of the envelope 31 on each side of the truncated ends of the surface 30A are depicted using dotted lines.

Among the aforementioned grooves, a distinction can be drawn between three types of groove that have different respective geometries. Thus, the surface 30A has three grooves $32_1$ which extend lengthwise in respective directions each lying in a plane perpendicular to the axis $X_{30}$. In other words, each of these grooves $32_1$ extends lengthwise right around the axis $X_{30}$, in a direction orthoradial to this axis.

The surface 30A is also provided with grooves $32_2$ and $32_3$ which extend lengthwise in respective directions that are helical overall, centred on the axis $X_{30}$. The grooves $32_2$ correspond to portions of a helix, connecting the truncated ends of the surface 30A in one direction, while the grooves $32_3$ correspond to portions of a helix connecting these truncated ends in the opposite direction. In other words, when viewed in elevation from the outside in a direction perpendicular to the axis $X_{30}$, that is to say when viewed as in FIG. 3, the grooves $32_2$ are parallel to one another, each running lengthwise in a direction that is inclined with respect to the axis $X_{30}$, while the grooves $32_3$ are parallel to one another and each run lengthwise in a direction that is inclined with respect to this axis, with the opposite inclination to that associated with the grooves $32_2$.

Advantageously, the grooves $32_1$, $32_2$ and $32_3$ are arranged at the surface 30A in such a way that they intersect at a number of intersections 33 as clearly visible in FIG. 3.

The body 20 is made of a composite material including a thermoset or thermoplastic plastic matrix, such as an epoxy, polyamide or phenolic resin. This matrix is fibre-reinforced, for example using carbon fibres.

The body 20 is arranged around the insert 30 in such a way that its composite material covers the surface 30A, filling the grooves $32_1$, $32_2$ and $32_3$ as clearly visible in FIG. 2. The connection between the body 20 and the insert 30 is fixed in so far as the plastic of the composite bonds firmly to the surface 30A. Thus, the body 20 has a solid main part 21 which externally surrounds the insert 30 fitting its surface 30A closely and from which projecting bulges 22, housed as a close fit in the grooves $32_1$, $32_2$ and $32_3$ emerge in the direction of the insert.

In the exemplary embodiment considered in the figures, the body 20 is intended to be fixed to a load-bearing structure, not depicted, and for that purpose comprises a peripheral flange 23 which projects outwards from the main part 21, at one end, along the axis $X_{30}$ of this part 21. The flange 23 has holes 24 uniformly distributed about the axis $X_{30}$ to take screws, not depicted, for assembling it with the aforementioned structure.

In service, the centrepiece 10 is articulated in the insert 30, the position of which is fixed with respect to the aforementioned structure, and this introduces stresses into this insert, into the body 20 and into the interface between the insert and the body. Because the surface 30A is spherical, the stresses experienced by the body/insert interface are distributed over a larger area than if the surface 30A was cylindrical. Furthermore, because of the spherical covering of the surface 30A with the composite material of the body 20, the latter mechanically holds the insert in place along the axis $X_{30}$, and in directions that are slightly inclined with respect to this axis. The presence of the grooves $32_1$, $32_2$ and $32_3$ strengthens the fixed attachment between the body and the insert: the area for contact between the composite material and the insert is in fact increased over the geometric envelope 31, with a corresponding increase in the adhesion between these components and, when the body/insert interface tends to yield, the bulges of composite material 22 create reliefs resisting the spread of damage to this interface. In particular, the grooves $32_1$ strengthen the attachment between the body and the insert in the direction of the axis $X_{30}$, which means that these components are held together well in the axial direction. The grooves $32_2$ and $32_3$ for their part play a part in strengthening the retention between the body and the insert during swivelling movements.

A method of manufacture for obtaining the ball joint assembly 1 will now be described with reference to FIGS. 4A to 4D.

A first step of this method is to obtain the centrepiece 10, configured with its exterior surface 10A spherical and its interior surface 10B cylindrical. This centrepiece is obtained through any appropriate method, particularly by casting and machining a metal.

Figure 4A:
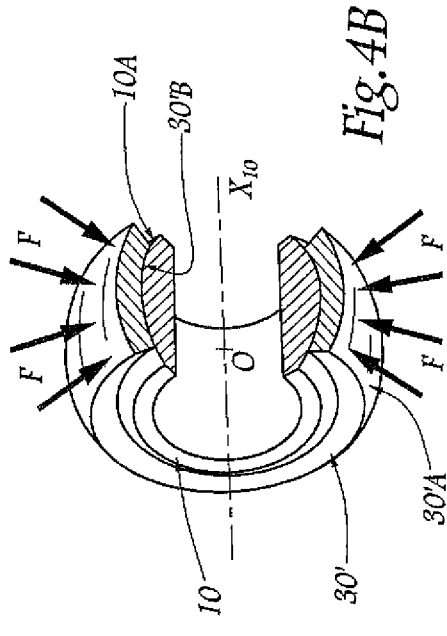
FIGS. 4A to 4D are schematic perspective views, with partial cutaway in the case of FIGS. 4A and 4B, FIGS. 4A to 4D respectively illustrating successive steps in the manufacture of the ball joint assembly of FIG. 1.

In a second step of the method, the centrepiece 10 is fitted into a tubular sleeve 30' as depicted in FIG. 4A. The inside diameter of this sleeve is chosen, to within a clearance, to be equal to the diameter r of the surface 10A so that the sleeve 30' is fitted around the centrepiece 10 such that it is centred on the axis $X_{10}$.

Figure 4B:
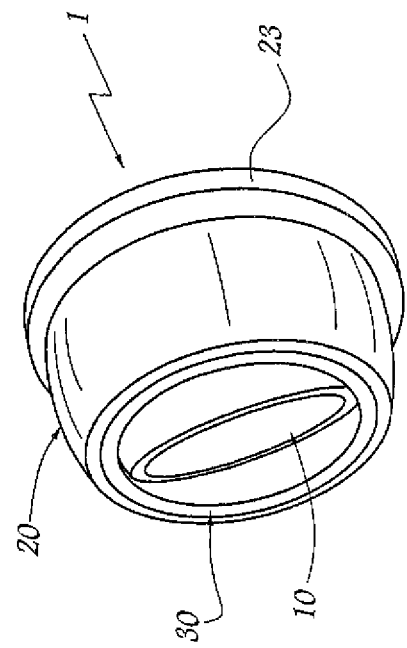

In a third step, a pressing or forming force is applied to the exterior face 30'A of the sleeve 30' as indicated by the arrows F in FIG. 4B. The wall of the sleeve 30' is therefore deformed to press the entire interior surface 30'B of the sleeve against the exterior surface 10A of the centrepiece 10 until the surface 30'B complements the surface 10A as illustrated in FIG. 4B. In practice, it is possible for the wall of the sleeve to be deformed with respect to the centrepiece because the metal chosen for the sleeve is softer than for the centrepiece and/or through a suitable choice of wall thickness for the sleeve and of the centrepiece.

Figure 4C:
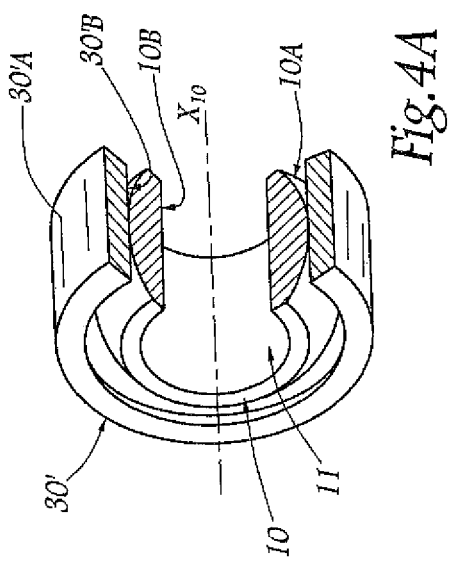

Because the sleeve 30' is deformed without any substantial alteration to its wall thickness, its exterior surface 30'A changes from its initial cylindrical geometry to a spherical geometry of radius R centred on the same centre as the surfaces 30'B and 10A, that is to say centred on O. Thus, on completion of the third step of the method, the spherical envelope defined by the surface 30'A forms the envelope 31. In other words, after having, if necessary, created the grooves $32_1$, $32_2$ and $32_3$, particularly by machining, in the surface 30'A as depicted in FIG. 4C, the sleeve 30' forms the insert 30, give or take a few potential finishing operations pertaining in particular to the longitudinal ends of the sleeve. Thus, at the end of the third step of the method, no complete resurfacing operation on the exterior surface of the sleeve is needed before progressing to the next stage.

Figure 4D:
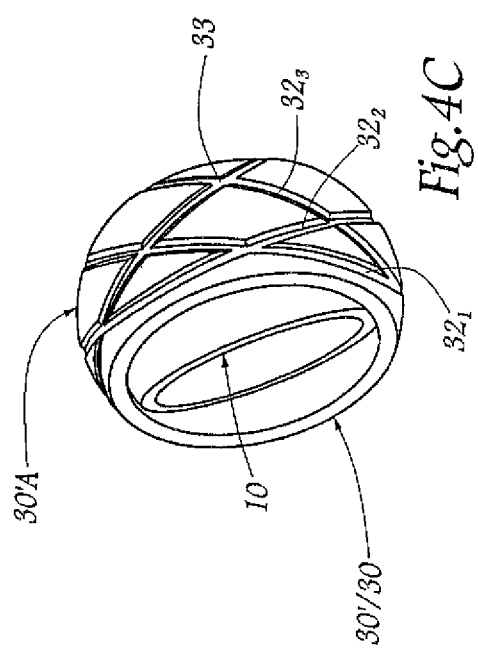

In a fourth step, the body 20, including its flange 23, is moulded around the sleeve 30' that forms the insert 30. The composite material of which this body is made is then moulded so that it covers the surface 30'A, particularly filling the grooves $32_1$, $32_2$ and $32_3$. At the end of this fourth step, the composite material is firmly bonded to the insert. This then yields the ball joint assembly 1 as depicted in FIG. 4D. Any potential finishing operations are then performed, such as the drilling of the holes 24 in the flange 23.

It is also conceivable to vary the ball joint assembly 1 and its method of manufacture in various ways. By way of example, the abovementioned geometry of the grooves $32_1$, $32_2$ and $32_3$ is merely one illustration in so far as other designs for these grooves are conceivable, aimed, amongst other things, at increasing or at reducing the number of intersections 33. Further, by way of an alternative form that has not been illustrated, the exterior surface 30A may, in place of or in addition to all or some of the grooves shown herein, be provided with at least one groove which extends lengthwise in a direction parallel to the axis $X_{30}$, thus significantly improving the retention of the insert 30 in rotation about this axis with respect to the external body 20.

Also, the exterior geometry of the external body 20 may adopt various forms, depending on the technical end-use of this body. Thus, by way of an alternative form that has not been depicted, its solid main part 21 may have no flange 23 so that this main part as such forms a collar for assembling with an associated structure. Another alternative form that has not been depicted is for the part 21 to constitute the longitudinal end of a composite tube, this tube serving to support mechanical components other than the centrepiece 10.

Additionally, the ball joint centrepiece 10 may be replaced by some other internal component for articulation with the insert 30 in order, with this insert and the composite external body 20, to form a mechanical joint assembly, in particular, this centrepiece may be replaced by rolling elements such as balls, rollers or needles, with or without cages, the joint assembly obtained then acting as a rolling bearing assembly.

The invention claimed is:

1. A method of manufacturing a ball joint assembly, which comprises, in succession:
    a first step of providing a ball joint centerpiece so as to have an exterior surface in a form of a truncated sphere;
    a second step of fitting the centerpiece into a metal tubular sleeve having a cylindrical interior surface and a cylindrical exterior surface;
    a third step of applying force to the exterior surface of the sleeve to urge the interior surface of the sleeve against the exterior surface of the centerpiece until the sleeve is shaped to complement the exterior surface of the centerpiece such that both the interior surface and the exterior surface of the sleeve change from their initial cylindrical geometries to truncated spherical geometries; and
    a fourth step of molding an external body made of a plastic matrix composite material around the exterior surface of the sleeve in such a way that the sleeve forms an insert and the exterior surface of the sleeve is fixedly attached to the external body so as to form an interface by way of which stresses can be transmitted between the insert and the external body, wherein, at the end of the third step and prior to the fourth step at least one groove is formed in the exterior surface of the sleeve, and wherein during the fourth step, the at least one groove is filled with the composite material of the external body.

2. The method according to claim 1, wherein, during the first step, the ball joint centerpiece is formed so as to have an axis of symmetry of revolution which passes through a center of the spherical exterior surface and which extends at right angles to two imaginary planes of truncation of the truncated sphere, these two planes being situated one on each side of the center.

3. The method of claim 2 wherein, during the third step, the force is applied to the sleeve on each side of the center.

4. The method of claim 1 including forming a plurality of grooves in the exterior surface of the sleeve prior to the fourth step and thereafter filing the plurality of grooves with the composite material during the fourth step.

5. The method of claim 4 including forming the plurality of grooves to intersect with one another.

6. The method of claim 5 wherein the plurality of grooves are formed by machining.

7. The method of claim 4 including forming at least one of the plurality of grooves so as to extend in a helical direction about the exterior surface of the sleeve.

8. The method of claim 4 including forming at least two of the plurality of grooves to be parallel with one another.

9. The method of claim 1 wherein the centerpiece is formed having a cylindrical opening extending there through.

10. The method of claim 1 wherein, between the end of the third step and the start of the fourth step, the truncated spherical geometry of the exterior surface of the sleeve is maintained.

11. The method of claim 1 wherein during the third step of deforming the sleeve, a wall thickness of the sleeve between the interior surface and the exterior surface of the sleeve is not altered as the sleeve is deformed from the initial cylindrical geometry to the spherical geometry of the interior surface and the exterior surface of the sleeve.

* * * * *